T. E. MURRAY.
METER TESTING CUT-OUT.
APPLICATION FILED JUNE 12, 1912.

1,066,216.

Patented July 1, 1913.

3 SHEETS—SHEET 1

Attest:

Inventor:
Thomas E. Murray
by
his Atty

T. E. MURRAY.
METER TESTING CUT-OUT.
APPLICATION FILED JUNE 12, 1912.

1,066,216.

Patented July 1, 1913.
3 SHEETS—SHEET 3.

Attest:

Inventor:
Thomas E. Murray
by
Atty

UNITED STATES PATENT OFFICE.

THOMAS E. MURRAY, OF NEW YORK, N. Y.

METER-TESTING CUT-OUT.

1,066,216.
Specification of Letters Patent.
Patented July 1, 1913.

Application filed June 12, 1912. Serial No. 703,117.

*To all whom it may concern:*

Be it known that I, THOMAS E. MURRAY, a citizen of the United States, residing at New York, in the county of New York and State of New York, have invented a certain new and useful Improvement in Meter-Testing Cut-Outs, of which the following is a specification.

The invention is a meter testing cut-out, wherein by the insertion of a gang plug circuit is closed direct from service to load, and thereafter by the insertion of a second gang plug circuit is broken from one meter terminal to load and testing apparatus simultaneously connected in circuit with the remaining meter terminals.

Figure 1:
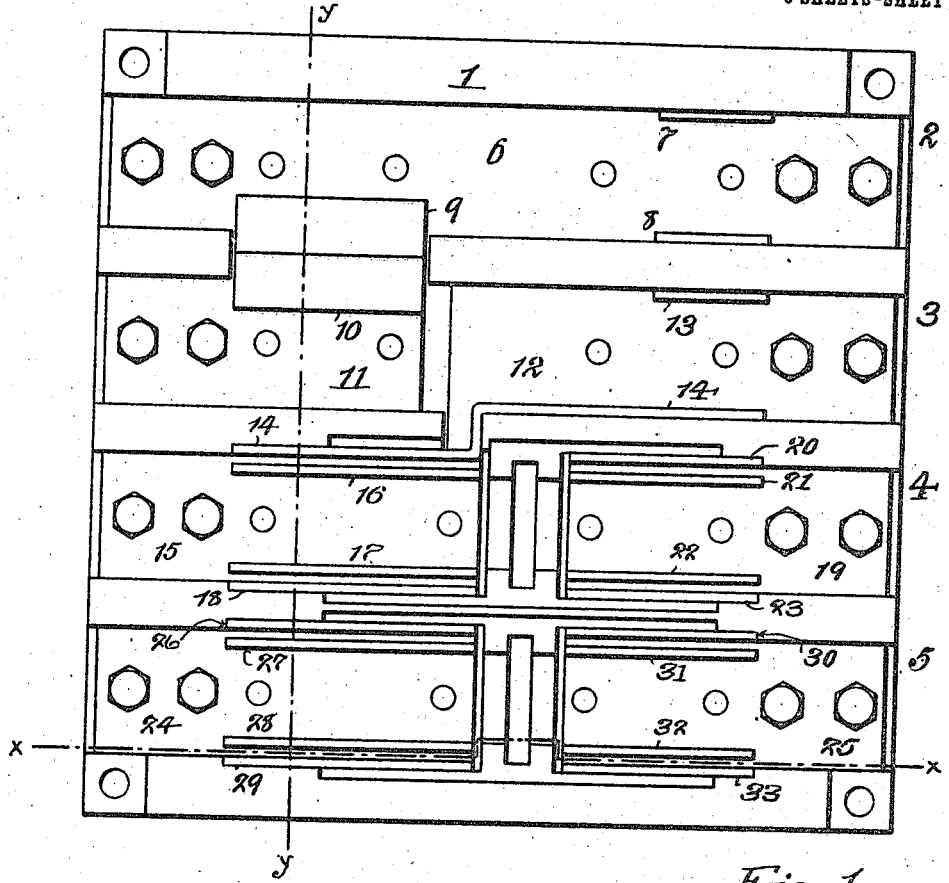
Figure 2:
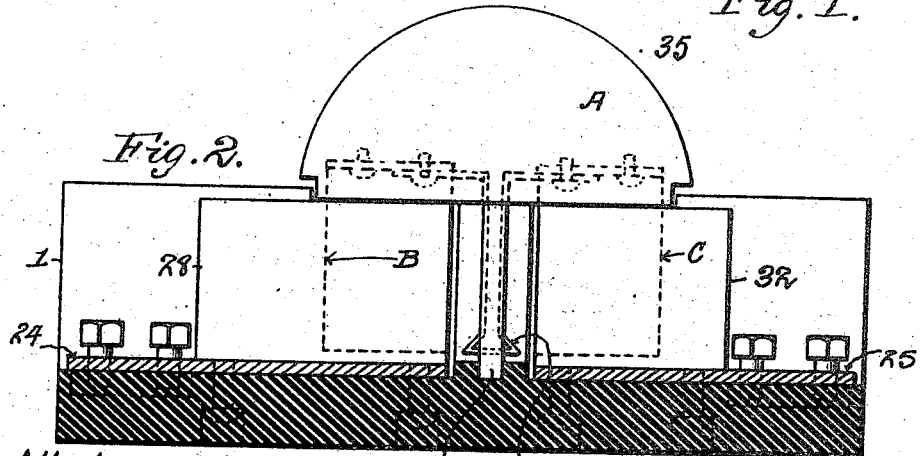
Figure 3:
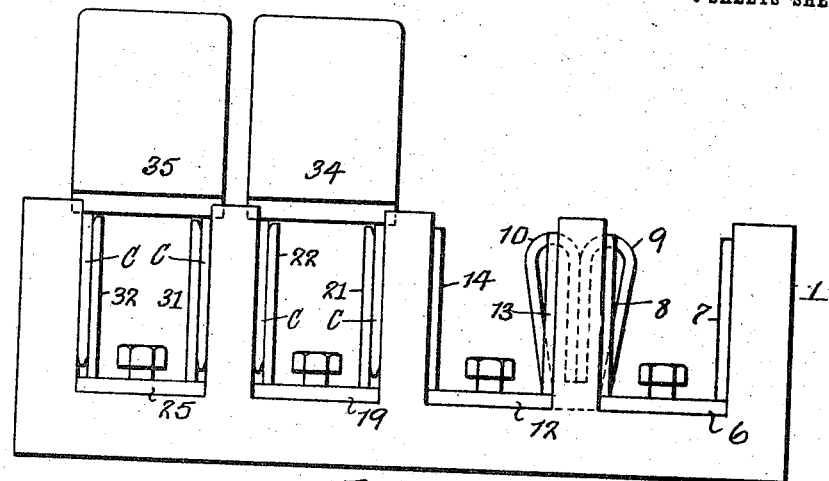
Figure 5:
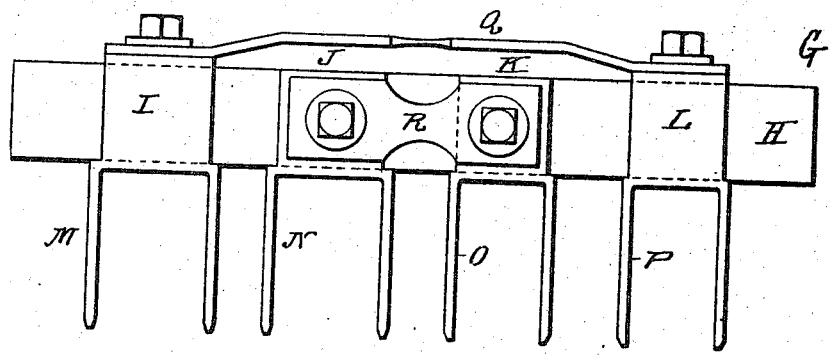
Figure 4:
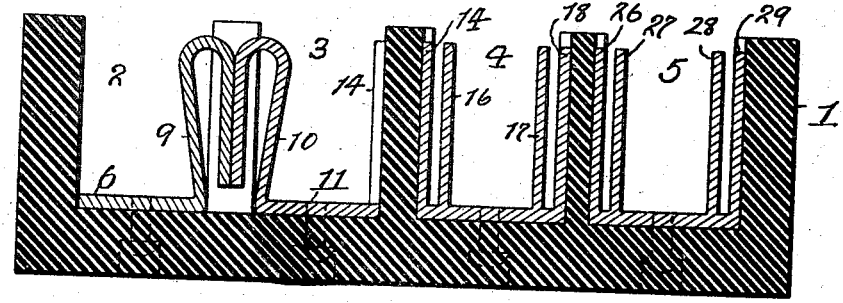
Figure 6:
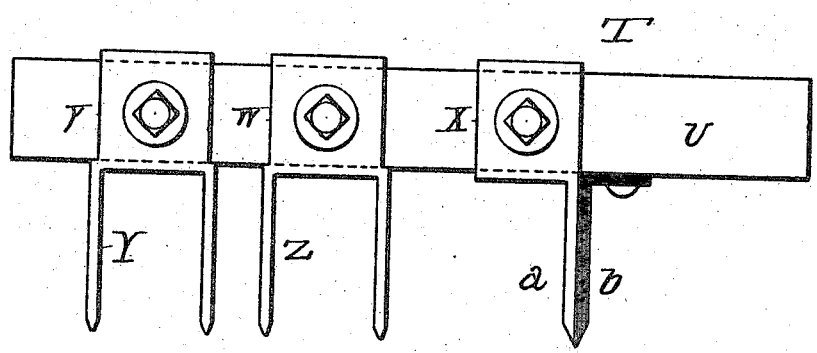
Figure 7:
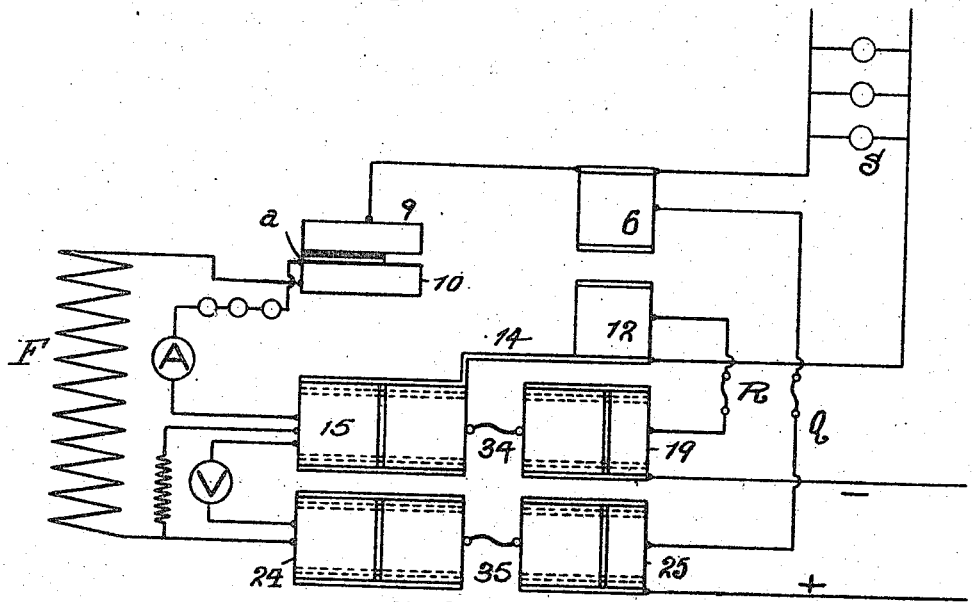

In the accompanying drawings—Figure 1 is a plan view of my meter testing cut-out. Fig. 2 is a longitudinal section on the line $x, x$ of Fig. 1. Fig. 3 is an elevation of the right hand end of Fig. 1, showing two of the fuse plugs in place. Fig. 4 is a section on the line $y, y$ of Fig. 1. Figs. 5 and 6 show the two testing gang plugs, and Fig. 7 is a diagram illustrating the electrical connections.

Similar letters and numbers of reference indicate like parts.

The base block 1, of refractory insulating material, has four channels 2, 3, 4, 5. On the bottom of channel 2 is a conducting plate 6, on which are the two upwardly extending contacts 7, 8 and one member 9 of the pair of bent over spring contacts 9, 10. On the bottom of channel 3 is a conducting plate 11, on which is the other member 10 of said pair: and also a plate 12, separated from plate 11, which carries two upwardly extending contacts 13, 14. Contact 14 is longer than contact 13, and extends through an opening in the partition between channels 3 and 4 to channel 4, where it is seated in said partition, and is connected to the plate 15 on the bottom of said channel. On plate 15 are upwardly extending contacts 16, 17, 18. Also in channel 4 and separate from plate 15 is a plate 19, having upwardly extending contacts 20, 21, 22, 23. In channel 5 are two separated conducting plates 24, 25. Plate 24 has upwardly extending contacts 26, 27, 28, 29, and plate 25 has similar upwardly extending contacts 30, 31, 32, 33.

The fuse plugs 34, 35 are alike, and are described in detail in my copending application, Serial No. 698,397, filed May 20th, 1912. Each comprises a case A of refractory insulating material, having a recess in its under side wherein are secured two pairs of downwardly depending contacts B, C. Integral with said case is a projection D which enters a recess in the bottom of the base block. The fuse strip E has its ends connected to the contacts B, C, and passes through an opening near the lower end of said projection. When fuse plug 34 is in place in channel 4, its depending contacts B, C enter between the pairs of contacts 14, 16: 17, 18: 20, 21, and 22, 23—and when the fuse plug 35 is in place in channel 5, its depending contacts B, C enter between the pairs of contacts 26, 27: 28, 29: 30, 31, and 32, 33. The contacts in channels 4, 5 extend beyond the plugs contacts B, C, when the same are in place, Fig. 2. With these outside portions of said channel contacts, the contacts on the testing plugs, hereinafter described, coöperate—so that said testing plugs may be inserted or removed without disturbing the fuse plugs. Under normal running conditions, circuit proceeds from plus service lead, to plate 25 in channel 5, through fuse plug 35, to plate 24 in said channel, to the field coil F of the meter, to the pair of spring contacts 9, 10, to plate 6 in channel 2, through the load S, to plate 12 and contact 14, to plate 15 in channel 4, fuse plug 34, plate 19, and negative service lead.

When it is desired to test the meter, the gang plug G shown in Fig. 5 is first applied. Said plug comprises a support H of insulating material, on which are inclosing metal frames I, J, K, L, each carrying a pair of depending contact plates M, N, O, P. To frames I, L are connected the terminals of a fuse strip Q, and to frames J, K are connected the terminals of a fuse strip R. This gang plug is inserted so that the members of its pair P of contacts coöperate with the pairs of contacts 32, 33 and 30, 31 in channel 5; the members of its pair O with the pairs of contacts 22, 23 and 20, 21 in channel 4; the members of its pair N with contacts 13, 14 in channel 3, and the members of pair M with contacts 7, 8 in channel 2. In this way, as shown in Fig. 7, the service leads become connected directly to the load S, and the fuses Q, R are brought into both sides of the circuit, which proceeds from positive service lead, to plate 25, to fuse Q on gang plug G, to plate 6, to load S, plate 12, fuse R on gang plug G, to plate 19, and negative service lead.

The testing gang plug T, Fig. 6, comprises a supporting bar U of refractory insulating material, inclosed in three metal frames V, W, X. Frames V and W carry depending pairs of contacts Y, Z, and frame X carries a single depending plate $a$, on one side of which is secured a similarly shaped plate $b$ of insulating material. Said plug is inserted so that the plates $a$, $b$ enter between the spring contacts 9, 10; the members of pair Z of contacts in pairs of contacts 14, 16 and 17, 18 in channel 4, and the members of pair Y of contacts in pairs of contacts 26, 27 and 28, 29 in channel 5. The ammeter and artificial load are connected to plate $a$ and pair of contacts Z on plug T, and the voltmeter to pairs of contacts Y and Z. The meter field coil terminals are connected to plate 11 in channel 3, and plate 24 in channel 5, and the potential coil terminals are connected between plate 24 in channel 5, and plate 15 in channel 4. The meter field coil circuit then proceeds as follows: from positive service lead, to plate 25, fuse plug 35, plate 24, through field coil F, to contact 10, plate $a$, artificial load, ammeter, plate 15, fuse plug 34, plate 19, and negative service lead. It will be obvious that by this arrangement the fuses are interposed both in the load and testing circuits—the fuses Q, R being in the load circuit, and the fuses in plugs 34, 35 in the testing circuit.

I claim:

1. A meter testing cut-out, comprising a base, service, load and meter circuit terminals thereon, means for establishing circuit directly from service to load, and means independent of said first-named means for breaking circuit from one of said meter terminals to load and simultaneously connecting test apparatus in circuit with the remaining meter terminals.

2. A meter testing cut-out, comprising a base, service, load and meter circuit terminals thereon, one of said meter terminals being a pair of plates held in resilient contact, a gang plug having projecting plates coöperating with said meter terminals and connected to testing apparatus, one of said projecting plates entering between said pair of meter terminals and having on one side a covering of insulating material, and independent means for establishing direct circuit from service to load.

In testimony whereof I have affixed my signature in presence of two witnesses.

THOMAS E. MURRAY.

Witnesses:
R. N. LAIDLAW,
F. W. JESSER.